United States Patent Office 3,049,492
Patented Aug. 14, 1962

3,049,492
METHOD OF INHIBITING THE GROWTH OF SULFATE REDUCING BACTERIA IN WATER FLOODING PROCESSES
Melvin De Groote, St. Louis, and Jen Pu Cheng, University City, Mo., assignors to Petrolite Corporation, Wilmington, Del., a corporation of Delaware
No Drawing. Filed May 5, 1959, Ser. No. 810,993
10 Claims. (Cl. 252—8.55)

This application is a continuation-in-part of our copending application Serial No. 532,121, filed September 1, 1955, and Serial Nos. 548,748 and 548,749, filed November 23, 1955.

This invention relates to a process of bacteria control, particularly from the standpoint of water flooding operations employed in the secondary recovery of petroleum oil. More specifically, it is concerned with the prevention of sulfate-reducing bacteria which are active in the plugging of sands and piping of the injection water of such secondary recovery systems.

The invention will be described particularly from what appears to be by far its most important use, to wit, to control sulfate reducing bacteria in connection with the recovery of oil from subterranean oil-bearing strata, and particularly those found in the piping systems. The use of an additive in flooding processes for recovery of oil from subterranean oil-bearing strata is described in U.S. Patent 2,233,381, dated February 25, 1941, to De Groote and Keiser.

Over a period of time it has been recognized that various additives may be added to flood water in such oil recovery procedures in order to obtain certain benefits or advantages. For instance, it has been proposed to add an acid in order to alter the pH of the water. See "Producers Monthly," vol. 9 (1945), #12, pp. 19–23. Along with the addition of acid, of course, it has been proposed to use a corrosion inhibiting agent. It has also been proposed to use a material such as a sequestering agent which prevents precipitation of calcium and magnesium salts. It has been proposed to add materials which would lower the surface tension of the water. It has been proposed to add agents which would increase the wettability of the flood water for the sand and thus loosen the oil. It has been proposed to employ materials which have bactericidal or fungicidal action. It has been proposed to add materials which prevent the formation of emulsions in the subterranean strata. It has been proposed to use chlorine, formaldehyde or similar products.

The addition of agents to flood water has been proposed for other purposes such as deflocculants so as to be certain that any insoluble material is suspended in the flood system and does not clog the system at any point.

At times it has been proposed to add an agent or additive or chemical compound which, although perhaps a compromise, was beneficial in more than a single respect, i.e., was polyfunctionally active and advantageous.

The present invention is concerned in its more important aspect with the process of bacterial control in sand flooding procedure and more specifically in the control of sulfate-reducing bacteria.

As to the prevention of microbiological growths in water flood operation see "Producers Monthly," volume 11 (1947), #12, pages 21 to 26. This article states "Bacterial Plugging of Sands "Numerous observations may be cited which indicate that bacteria are very effective in causing a plugging of sand faces in water input wells.

"In the East Texas field where brines are being injected back into the sands in order to prevent stream pollution and to help maintain the reservoir pressure it has been found necessary to treat the injected water to prevent growth of bacteria, particularly sulfate-reducing bacteria which are active in plugging the sands in the injection wells. Large periodic doses of chlorine, or formaldehyde have been found to be beneficial in most cases but not entirely satisfactory in correcting the trouble."

Also see "Producers Monthly," volume 18, No. 4, pages 18 to 22, "The Role of Microorganisms," R. C. Allred, for a discussion of bacterial control in oil field water flooding operations.

This invention is thus concerned with a process of inhibiting bacteria growth in the recovery of oil from oil-bearing strata by means of flood water taking place in the presence of anaerobic sulfate-reducing bacteria and in the presence of soluble ferrous salts. The process is characterized by being conducted in the presence of a solvent solution of a bactericide being the reaction product obtained by reacting at a temperature of about 100° to 300° C. for from about 1 to 4 hours (A) an oxirane ring containing compound selected from the class consisting of epoxidized higher fatty acids, epoxidized higher fatty acid esters, epoxidized higher fatty acid amides, epoxidized higher fatty alcohols and epoxidized higher fatty acid glycerides, with (B) an oxyalkylation-susceptible nitrogen containing compound selected from the class consisting of hydrazine and monoamino and polyamino compounds composed of carbon, hydrogen, oxygen and nitrogen atoms, having only functional groups selected from the class consisting of hydroxyl groups, primary amino groups and secondary amino groups and having at least one such functional amino group; said reaction between (A) and (B) involving rupture of the oxirane ring and resulting in the formation of one of the following groupings

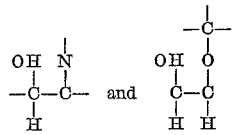

For purpose of convenience, what is said hereinafter will be divided into four parts;

Part 1 is concerned with the derivatives obtained by the epoxidation of fatty acids or the like, and generally characterized by the presence of at least one oxirane ring per fatty acid molecule;

Part 2 is subdivided into eleven sections, and is concerned with amino compounds which are non-resinoid in nature and may or may not include in their structure a hydrophobe group, i.e., a group having 8 or more uninterrupted carbon atoms in a single radical, or the like. Such amino reactants must contain a reactive hydrogen atom generally attached to either nitrogen or oxygen. The presence of such reactive hydrogen atom is necessary for reaction with the oxirane ring. Stated another way, such reactants must be oxyalkylation-susceptible.

Part 3 is concerned with reactions involving the two classes of reactants above, i.e., those described in Part 1 and those described in Part 2;

Part 4 is concerned with bacteria control employing the reaction products of Part 3.

PART 1

The epoxidation of ethylenic compounds and particularly esters of unsaturated fatty acids, amides of unsaturated fatty acids, naturally occurring glycerides, unsaturated aliphatic alcohols, and the unsaturated fatty acids themselves, is well known. For instance, it has been described in the following patents:

U.S. Patents Nos. 2,443,280, 2,445,892, 2,457,328, 2,458,484, 2,485,160, 2,487,829, 2,510,905, 2,556,145, 2,567,237, 2,567,930 2,569,502 2,661,367, 2,686,805, 2,692,271.

Additionally epoxidation procedures have been described in the trade literature of organizations which supply one or more reactants employed in the procedure. For instance, see Bulletin P63–355 entitled "Hydrogen Peroxide-Resin Technique for the Preparation of Peracetic Acid," E. I. du Pont de Nemours & Company; Bulletin P61–454 entitled "Hydrogen Peroxide-Resin Technique for Epoxidation of Unsaturated Fats, Oils, and Derivatives," E. I. du Pont de Nemours & Company; and booklet entitled "Hydrogen Peroxide," issued by Buffalo Electro-Chemical Company, Inc. See also Chemical Week, August 1, 1945, page 100; and Chemical Week, December 25, 1954, page 32.

An excellent brief description is found in U.S. Patent No. 2,692,271, dated October 19, 1954, to Greenspan et al.

In broad aspect, epoxidation comprises a reaction at a point of unsaturation of the ethylene type in a hydrocarbon compound whereby the unsaturated linkage is by the addition of oxygen changed to an oxirane compound.

Many methods of epoxidation have been suggested. For instance, the ethylene linkage has been reacted upon by the employment of perbenzoic acid in a non-aqueous solvent such as chloroform and peracetic acid used in aqueous solution. Many other peracids have been found effective as epoxidizing agents, perphthalic and percamphoric, among others.

Fatty acids and fatty acid derivatives which may be subjected to epoxidation by conventional procedures are ilustrated by the following:

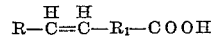

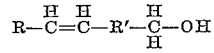

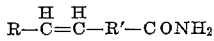

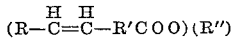

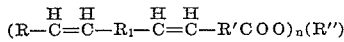

In the above formulas R and R' represent monovalent and divalent hydrocarbon radicals having at least 3 carbon atoms. $R_1$ is a divalent radical.

Stated another way, it is preferable that the ethylene linkage which is subjected to epoxidation is at least 2 carbon atoms removed from the terminal carbon atom is at least 2 carbon atoms removed from the terminal carbon atom or the carboxyl carbon atom, or what was initally the carboxyl carbon atom. For example, in the second formula, i.e., the formula of the alcohol, it will be noted of course that the carboxyl group has been converted into the terminal alcoholic radical.

In the last two formulas R" represents the ester radical which may be monohydric, dihydric, trihydric, tetrahydric, etc.

In the last formula $n$ is a small whole number varying from 2 to 6 for example, which corresponds to the valency of the multivalent radical R".

One can purchase a large number of suitable epoxidation products in the open market or can prepare the same if desired. In a general way, of course, the most economical products are those derived from naturally-occurring glycerides as, for example, soyabean oil.

The vegetable oils which when epoxidized can be used in practicing the present invention are those glycerides of saturated and unsaturated acids which have a degree of unsaturation represented by an iodine value of from 90 to 205 and in which the fatty acids neither are hydroxylated nor possess conjugated unsaturation. The semi-drying vegetable oils, which are primarily glycerides of oleic and linoleic acids, are preferred. Among those oils which can be used are epoxidized peanut, rapeseed, cottonseed, corn, tobacco seed, cucurbit, sunflower, safflower, poppyseed, linseed, perilla, and soybean oils. Of these epoxidized oils, soybean oil is particularly efficient.

If the fatty acid group has some other functional group present, difficulty may be involved in obtaining optimum yields for some reason that is not entirely clear. This would apply, for example, to castor oil, and ricinoleic acid esters. On the other hand, if castor oil is reacted with a low molal acid such as acetic acid, propionic acid, or the like, then these difficulties appear to be eliminated. There also appears to be difficulty in obtaining suitable yields in the case of conjugated unsaturation. In some instances where the unsaturation is not conjugated there is indication that there may be a shift during reaction to produce conjugation. In other words, in the epoxidation of the fatty acid or fatty acid ester or the like, if the fatty acid is polyethylenic it is very important that the ethylenic radicals be non-conjugated. The fatty acids themselves may contain 8 to 22 carbon atoms. The best example of the monoethylenic acid is, of course, oleic acid and perhaps erucic acid. Both are readily available as glycerides. As to the polyethylenic acids, particular attention is directed to linoleic. As to an example of an acid having 3 ethylenic linkages attention is directed to linolenic. These acids, of course, are available in the form of glycerides, particularly mixed glycerides. Other polyethenoic acids are obtained from oils of aquatic origin.

The alcohols derived from the fatty acids are susceptible to epoxidation but present added difficulties by resulting in somewhat lower yields, perhaps due to the presence of the hydroxyl group. However, alcohols which are suitable for epoxidation include, among others, oleyl alcohol, linoleyl alcohol, linolenyl alcohol, mixed arachidonylclupanodonyl alcohols, erucyl alcohol, and ricinoleyl alcohol.

The various unsaturated acids previously described, monoethylenic or polyethylenic, can be converted into the corresponding esters by conventional methods. In fact, esters of soya bean fatty acids are available commercially as well as esters of various other unsaturated acids, for instance, ricinoleic acid. The esters generally available are methyl, ethyl, propyl, and butyl. Other esters can be employed, however, wherein the monohydric alcohol can be amyl alcohol, hexyl alcohol, allyl, etc. The alcohols can be cyclic as in the case of benzyl alcohol, cyclohexanol, furfuryl, etc. The alcohols are generally characterized by having less than 8 uninterrupted carbon atoms and generally less than 8 carbon atoms in the alcohol without any limitation whatsoever. Needless to say, when the monohydric alcohol esters are derived from mixed fatty acid glycerides, the esters themselves represent a cogeneric mixture.

Epoxidized fatty acid amides can be prepared according to the method described in U.S. Patent 2,567,237 to Scanlan et al.

PART 2

Section 1

The present section is concerned with suitable monoamines. The monoamines are primary or secondary amines which can or need not contain one or a plurality of hydroxyl radicals. The monoamine, if primary, can be treated with an alkylene oxide to yield a hydroxylated secondary amine.

In addition to the mono- and di-methyl, ethyl and propyl amines, other monoamines include the following:

| | |
|---|---|
| n-Butyl amine | Dodecylamine |
| Dibutyl amine | Monoethanolamine |
| 2-ethylhexyl amine | Diethanolamine |
| Di(2-ethylhexyl) amine | N-methyl ethanolamine |
| Monoisopropanolamine | N-ethyl ethanolamine |
| Diisopropanolamine | n-Amylamine |
| Methyl isopropanolamine | Di-n-amylamine |
| Butyl isopropanolamine | Sec-amylamine |

Hexylamine
Dihexylamine
Heptylamine
Octylamine
Dioctylamine
Decylamine
Furfurylamine N-ethylbutylamine
2-amino-4-methylpentane
4-amino-2-butanol
5-isopropylamino-1-pentanol
N-butylaniline Similarly, secondary high molecular weight aliphatic amines known as Armeen 2C and Armeen 2HY, as described in circular entitled "Secondary Armeens," as issued by Armour Chemical Division, Chicago, Illinois.

Also, high molecular weight aliphatic amines known as Armeen 10, Armeen 16D, Armeen HTD, Armeen 18D, and Armeen CD, as described in a pamphlet entitled "Armeens," issued by Armour Chemical Division, Armour and Company, Chicago, Illinois.

Suitable amines having an aromatic ring include alpha-methylbenzylamine and alpha-methylbenzylmonoethanolamine.

Other amines include:

2-amino-2-methyl-1-propanol
2-amino-2-methyl-1,3 - propanediol
2-amino-2-ethyl - 1,3 - propanediol
3-amino-2-methyl-1-propanol
2-amino-1-butanol
3-amino - 2,2 - dimethyl-1-propanol
2-amino - 2,3 - dimethyl-1-propanol 2,2-diethyl-2-amino ethanol
2,2-dimethyl-2 - amino ethanol
3-amino-1,2-butanediol
4-amino-1,2-butanediol
2-amino-1,3-butanediol
4-amino-1,3-butanediol
2-amino-1,4-butanediol
3-amino-1,4-butanediol
1-amino-2,3-butanediol
Tris-(hydroxy methyl) amino methane Amines having ring structures of course include aniline, diphenylamine, cyclohexylamine, dicyclohexylamine, and various comparable amines with alkyl substituents in the ring.

Other suitable amines are those obtained from sugars or comparable derivatives, such as glucamine and maltosamine. A product such as glucose can be reacted with a primary amine such as hexylamine, acetylamine, decylamine, dodecylamine, or the like, and then subjected to reduction so as to give other suitable primary amines.

A monoamine compound can be cyclic or non-cyclic. Those which are cyclic may be heterocyclic as in the case of morpholine and its derivatives or oxazolines which may be regarded as derivatives of N-acyl-2-amino-ethanols. This would apply where instead of being a derivative of monoethanolamine the oxazoline was a derivative of a low molal acid or a high molal acid and 2-amine-2-methyl-1,3-propanediol.

Section 2

The polyamines which may be employed as reactants fall within two types. The first type is characterized by the fact that the polyamines have at least one primary amino radical separated from another primary or secondary amino radical by two to three carbon atoms in a single chain. These polyamines under certain conditions can form cyclic amidines and thus are important from what is said in Part Six, subsequently.

One may use polyamines corresponding to the formula

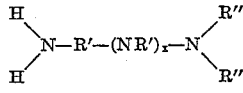

$X = 0$ to $8$ in which R″ is hydrogen, alkyl, cycloalkyl, aryl, or aralkyl and R′ is a divalent radical such as —CH$_2$CH$_2$—

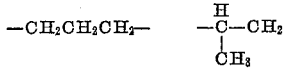

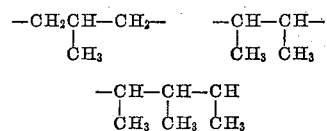

Stated another way, the polyamines have at least one primary amino group separated from another primary or secondary amino group by 2 to 4 carbon atoms. Examples of suitable amines include:

Ethylenediamine
Diethylenetriamine
Triethylenetetramine
Tetraethylenepentamine
Propylenediamine
Dipropylenetriamine Tripropylenetetramine
Butylenediamine
Aminoethylpropylenediamine
Aminoethylbutylenediamine

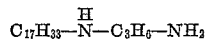

Other polyamines in which the nitrogen atoms are separated by a carbon atom chain having 4 or more carbon atoms include the following: Tetramethylenediamine, pentamethylenediamine, and especially hexamethylenediamine. The latter is of particular interest because the product is commercially available in light of its use in the manufacture of synthetic fibre.

If desired, one can prepare a variety of reactants having two or more amino groups and at least one hydroxyl group. One may use modifications of procedures or the procedures themselves as described in U.S. Patents Nos. 2,046,720, dated July 7, 1936, to Bottoms; 2,048,990, dated July 28, 1936, to Britton et al.; 2,447,821, dated August 24, 1949, to Sankus; and 1,985,885, dated January 1, 1935, to Bottoms. Examples include the following:

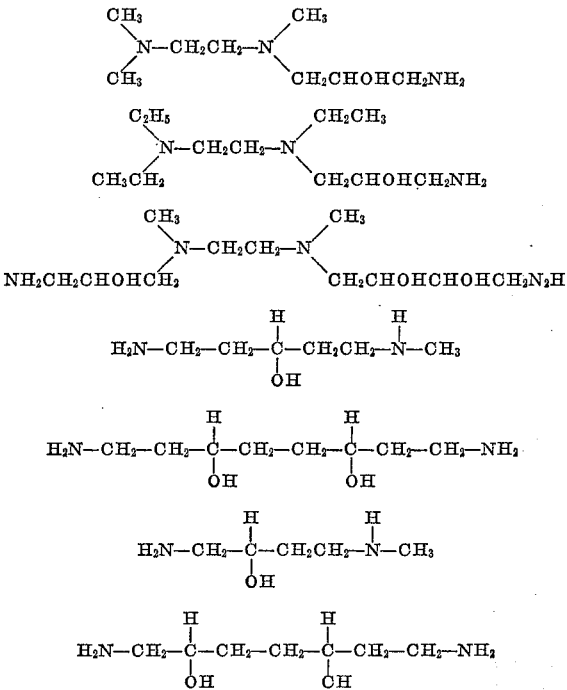

Other suitable amines are exemplified by ethylenebisoxypropyleneamine,

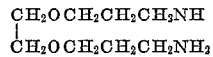

and derivatives obtained by treating ethylenebisoxypropylamine with 1, 2, 3 or 4 moles of ethylene oxide, propylene oxide, butylene oxide, or the like.

Other compounds including those having cyclic structures include piperazine, and the corresponding derivatives obtained by treating piperazine with alkylene oxides. The same applies to substituted piperazine such as the 2,5-dimethylpiperazine.

As to mono-substituted dialkanol piperazine see U.S. Patent No. 2,421,707, dated June 3, 1947, to Malkemus.

Section 3

Another example of polyamine which may be employed as a reactant is the kind described as "Duomeens."

TABLE 1

Duomeen is a trademark designation for certain diamines made by Armour Chemical Division, Armour & Company, Chicago, Illinois. The Duomeens have the following general formula:

$$R-\underset{H}{N}-CH_2-CH_2-CH_2-NH_2$$

R is an alkyl group derived from a fatty acid or from the mixed fatty acids as obtained from certain oils. The specific Duomeen and the source of the radical R are as follows:
(1) Duomeen 12         R=lauric
(2) Duomeen C          R=Coconut oil fatty acid
(3) Similarly, a comparable diamine, presumably obtained from Rosin Amine D and acrylonitrile, is obtainable from Hercules Powder Company, Wilmington, Delaware. The composition of Rosin Amine D is as follows:

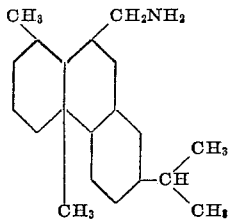

Polyamines from monoamines and cyclic imines, such as ethylene imine.

(4) $$C_8H_{17}-\underset{H}{N}-CH_2CH_2-NH_2$$
N-octyl ethylenediamine (5) $$C_{14}N_{29}-\underset{H}{N}-CH_2CH_2-NH_2$$
N-tetradecyl ethylenediamine (6) $$C_{16}H_{33}-\underset{H}{N}-CH_2-CH_2-NH_2$$
N-hexadecylethylenediamine (7) $$C_{12}H_{25}-\underset{H}{N}-C_2H_4-\underset{H}{N}-C_2H_4-\underset{H}{N}-C_2H_4-NH_2$$
N-dodecyl triethylenetetramine (8) $$C_{12}H_{25}-\underset{H}{N}-C_3H_6-NH_2$$
N-dodecyl propylenediamine (9) $$C_{10}H_{21}-\underset{H}{N}-C_4H_8-NH_2$$
N-decyl butylenediamine

(10) Polyamines containing tertiary amino groups

(11) $$C_{12}H_{25}N-C_3H_6-\underset{\underset{C_2H_5}{|}}{N}-C_2H_5$$

It is to be noted that all the above examples show high molal groups, i.e., 8 carbon atoms or more. The same derivatives in which methyl, ethyl, propyl, butyl, amyl, hexyl groups, or the like, appear instead of octyl, decyl, etc., are equally satisfactory.

Section 4

Polyamines of the kind described above, i.e., those having at least one primary amino radical separated from another primary or secondary amino radical by two to three carbon atoms in a single chain, can be converted into a number of products which in turn still have the characteristic requirements previously noted, i.e., are still oxyalkylation susceptible. A good example is a cyclic amidine obtained from a polyamine. This may be illustrated by the following table:

TABLE 2

(Ex. No. 1)

$$C_{11}H_{23}-C\underset{\underset{H}{|}}{\overset{N-CH_2}{\underset{N-CH_2}{\diagdown}}}$$

2-undecylimidazoline (Ex. No. 2)

$$C_{17}H_{35}-C\underset{\underset{H}{|}}{\overset{N-CH_2}{\underset{N-CH_2}{\diagdown}}}$$

2-heptadecylimidazoline (Ex. No. 3)

$$C_{17}H_{33}C\underset{\underset{H}{|}}{\overset{N-CH_2}{\underset{N-CH_2}{\diagdown}}}$$

2-oleylimidazoline (Ex. No. 4)

$$C_{17}H_{35}-C\underset{\underset{H}{|}}{\overset{N-CH-CH_3}{\underset{N-CH-CH_3}{\diagdown}}}$$

2-heptadecyl-4,5-dimethylimidazoline (Ex. No. 5)

$$C_{11}H_{21}-C\overset{N-CH_2}{\underset{\underset{C_2H_4-NH-C_2H_4-NH_2}{N-CH_2}}{\diagdown}}$$

1-diethylenediamine-2-undecyleneylimidazoline (Ex. No. 6)

$$HO-C_{17}H_{32}-C\overset{N-CH_2}{\underset{\underset{C_2H_4-NH-C_2H_4-NH-C_2H_4-NH_2}{N-CH_2}}{\diagdown}}$$

Triethylenetriamine-2-hydroxy-heptadecyleneylimidazoline (Ex. No. 7)

$$C_{19}H_{29}-C\overset{N-CH-CH_3}{\underset{\underset{C_3H_6-NH-C_3H_6-NH_2}{N-CH_2}}{\diagdown}}$$

1-aminopropylaminopropyl, 2-abietyl, 4-methylimidazoline

Tetrahydropyrimidinees from monocarboxy acids and trimethylenepolyamines:

(Ex. No. 8)

$$C_{17}H_{35}-C\overset{N-CH_2}{\underset{\underset{C_2H_4-NH_2}{N-CH_2}}{\diagdown}}CH_2$$

1-aminoethyl, 2-heptadecyltetrahydropyrimidine (Ex. No. 9)

$$C_{12}H_{25}-C\overset{N-CH-CH_3}{\underset{\underset{C_2H_4-NH-C_2H_4-NH_2}{N-CH_2}}{\diagdown}}CH_2$$

1-aminoethylaminoethyl, 2-dodecyl, 4-methyl tetrahydropyrimidine

Cyclic amidines are derived conveniently from carboxy acids, including polycarboxy acids. As is well known, some polycarboxy acids have 3 or more carboxyl radicals; thus, it is possible to obtain cyclic amidines in which 3 or more ring radicals appear. The present invention, however, is limited to cyclic amidines having not over 2 ring radicals and preferably only one ring radical.

Cyclic amidines having more than one ring radical are illustrated by the following formulas:

(Ex. No. 10)
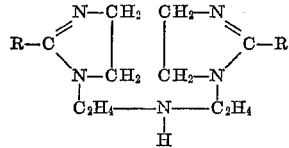

R = hydrocarbon radical containing 8-32 carbon atoms

Cyclic amides containing basic tertiary amino groups:

(Ex. No. 11)
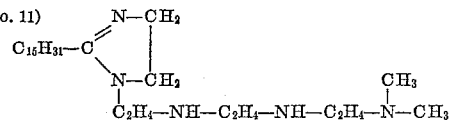

It is to be noted that all the above examples show high molal groups, i.e., 8 carbon atoms or more. The same derivatives in which methyl, ethyl, propyl, butyl, amyl, hexyl groups, or the like, appear instead of groups having 11, 12, 17 or 19 carbon atoms, are equally satisfactory.

Section 5

Actually, cyclic amidines of the kind described previously are obtained in many instances from amides as intermediates in amidine manufacture. Suitable amides derived from amines of the kind described previously are suitable as reactants for the present purpose. Such amides are shown in the following table:

TABLE 3

(Ex. No. 1)
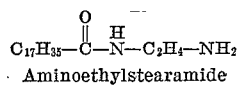
Aminoethylstearamide (Ex. No. 2)
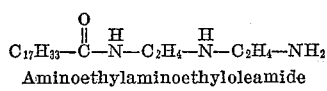
Aminoethylaminoethyloleamide (Ex. No. 3)
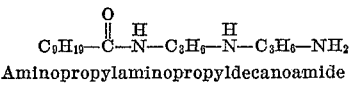
Aminopropylaminopropyldecanoamide (Ex. No. 4)
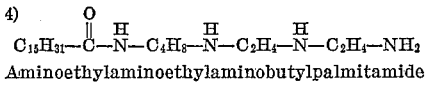
Aminoethylaminoethylaminobutylpalmitamide (Ex. No. 5)
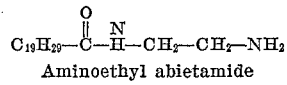
Aminoethyl abietamide (Ex. No. 6)
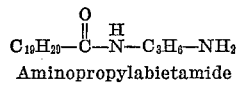
Aminopropylabietamide (Ex. No. 7)
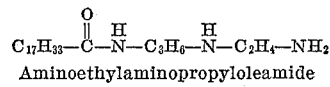
Aminoethylaminopropyloleamide Diamides may be obtained from polyamines and 2 moles of acid.

(Ex. No. 8)
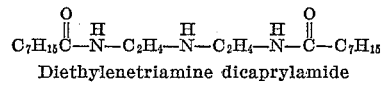
Diethylenetriamine dicaprylamide (Ex. No. 9)
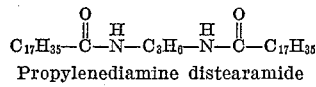
Propylenediamine distearamide Polyamides are derived from polycarboxy acids as well as monocarboxy acids. Thus it is possible to get polyamides by using acids containing more than one carboxyl group, as illustrated in the following examples:

(Ex. No. 10)
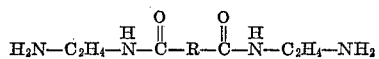

R—(COOH)$_2$ = Emery Dimeric Acid available commercially and said to be dilinoleic acid (Ex. No. 11)
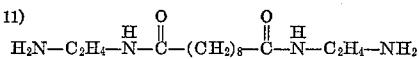

Amino amides can be obtained from polyamides in which there is a terminal tertiary amine radical having a basic nitrogen atom. Another procedure involves the production of an amino amide from a polyamine in which the terminal radicals are either primary or secondary followed by alkylation of the amide so as to convert the residual terminal radical into a basic tertiary amine radical. Another procedure is to use a secondary amine, such as dibutylamine or dihexylamine, and react stepwise with ethylene imine or propylene imine. The polyamine so obtained contains a basic tertiary amino radical. The acylation of such a polyamine results in an amino amide which will form complexes comparable to those obtained from a basic tertiary amine. Examples of such amino amides are as follows:

(Ex. No. 12)
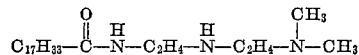

(Ex. No. 13)
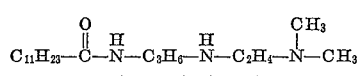

It is to be noted that all the above examples show high molal groups, i.e., 7 carbon atoms or more. The same derivatives in which methyl, ethyl, propyl, amyl, butyl, hexyl groups, or the like, appear instead of groups having 9, 17, 19 carbon atoms or the like, are equally satisfactory.

Section 6

One type of hybrid compound includes either an imidazoline ring or a tetrahydropyrimidine ring. Since it is more economical to use the imidazolines rather than the tetrahydropyrimidines this particular type will be illustrated but it is understood that either type can be used. One example is an instance in which the imidazoline radical appears, and also a high molal radical, for instance, a $C_{13}H_{17}$ radical. In this instance there are two high molal groups.

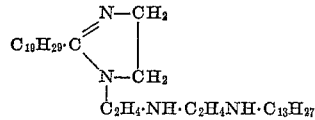

Actually a cyclic amidine having a hydroxy alkyl group may be esterified, provided that there is still a reactive hydrogen atom for combination with the epoxidized compound. This is illustrated by the following:

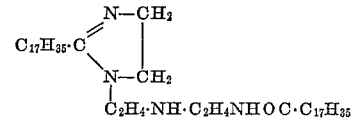

The type in which there is an imidazoline ring and only one high molal amino group is illustrated in the following:

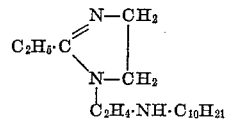

If one employs a dicarboxy acid having 8 or more carbon atoms indicated by R(COOH)$_2$, then compounds of the following type can be prepared:

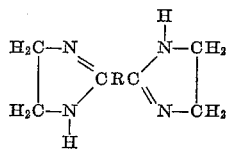

It is obvious that a high molal amine such as N dodecyl diethylene triamine having the formula $$C_{12}H_{25}-\overset{H}{N}-CH_2CH_2-\overset{H}{N}-CH_2-CH_2-NH_2$$

can be converted into an amide by reaction with a low molal acid, such as acetic acid or a high molal acid, such as oleic acid. Such compounds can be illustrated by the following:

$$C_{12}H_{25}-\overset{H}{N}-CH_2CH_2-\overset{H}{N}-CH_2-CH_2-N\overset{OC \cdot CH_3}{\underset{H}{}}$$

or $$C_{12}H_{25}-\overset{H}{N}-CH_2CH_2-\overset{H}{N}-CH_2-CH_2-N\overset{OC \cdot C_{17}H_{33}}{\underset{H}{}}$$

Similarly, if the dodecyl diethylene triamine is treated with a mole of ethylene oxide or preferably 2 moles of ethylene oxide so as to have a terminal radical, thus:

$$C_{12}H_{25}-\overset{H}{N}-CH_2CH_2-\overset{H}{N}-CH_2-CH_2-N\overset{C_2H_4OH}{\underset{C_2H_4OH}{}}$$

it becomes obvious that an ester can be formed from either acetic acid or oleic acid as illustrated by the following:

$$C_{12}H_{25}-\overset{H}{N}-CH_2CH_2-\overset{H}{N}-CH_2-CH_2-N\overset{C_2H_4OOC \cdot C_{17}H_{33}}{\underset{C_2H_4OH}{}}$$

$$C_{12}H_{25}-\overset{H}{N}-CH_2CH_2-\overset{H}{N}-CH_2-CH_2-N\overset{C_2H_4OOC \cdot CH_3}{\underset{C_2H_4OH}{}}$$

Needless to say, a compound such as dodecyl diethylene triamine previously illustrated can be converted into an imidazoline by conventional procedure, such a procedure already has been described above. The imidazoline may be derived from either a low molal acid, i.e., acetic acid, or a high molal acid, such as oleic acid.

Similarly, an amine of the following type:

$$H_2N-CH_2-\underset{OH}{\overset{H}{C}}-CH_2CH_2-\overset{H}{N}-C_{10}H_{21}$$

$$H_2N-CH_2-\underset{OH}{\overset{H}{C}}-CH_2CH_2-\overset{H}{N}-C_{10}H_{21}$$

can be converted into an oxazoline by using either a low molal monocarboxy acid or a high molal monocarboxy acid: or if the $C_{10}H_{21}$ radical above is replaced by a $CH_3$ radical suitable compounds are obtained using a higher fatty acid, such as oleic acid.

Such compounds can be illustrated by the following:

$$H_2C\underset{N}{\overset{}{-}}\underset{\underset{C_8H_{17}CH:CH(CH_2)_6\overset{}{C}H_2}{\overset{}{\underset{C}{\diagdown\diagup}}}}{C}-CH_2CH_2\overset{H}{N}-CH_3$$

The introduction of a pent-oxazoline group requires the use of a reactant such as the following:

$$C_{17}H_{35}\overset{O}{C}OC_2H_4N-CH_2-CH_2-\underset{OH}{\overset{H}{C}}-CH_2-CH_2-\underset{OH}{\overset{H}{C}}-CH_2-CH_2-NH_2$$
$$\phantom{C_{17}H_{35}\overset{O}{C}OC_2H_4N}|\phantom{-CH_2-CH_2-\underset{OH}{\overset{H}{C}}-CH_2-CH_2-\underset{OH}{\overset{H}{C}}-CH_2-CH_2-NH_2}$$
$$\phantom{C_{17}H_{35}\overset{O}{C}OC_2H_4N}CH_3$$

The previous examples seem to be more than ample for purpose of illustration. It is to be noted that combinations in which at least three different types of radicals appear are readily obtainable by reacting an imidazoline obtained from a tetramine or pentamine with an acid, such as acetic acid or oleic acid so as to yield an amido imidazoline and then react such product with a glycidyl ether of the type $$R-O-\underset{H}{\overset{H}{C}}-\overset{H}{\underset{}{C}}\underset{O}{\diagdown}\overset{H}{\underset{}{CH}}$$

in which R represents a low or high molal group. Similarly, an imidazoline may be subjected to oxyalkylation and then to esterification followed by the use of glycidyl ether of the kind above described.

Likewise, another type of reactant is represented by compounds of the following structure which have been described in the patent literature $$\overset{R}{\underset{R}{\diagdown}}N\underset{H}{\overset{H}{C}}-\overset{H}{\underset{}{C}}\underset{O}{\diagdown}\overset{H}{\underset{}{CH}}$$

R = alkyl

See Journal of the American Chemical Society, volume 68 (1946), page 1291.

Compounds containing the oxazoline ring or pentoxazoline ring and derived from a dicarboxy acid can employ the carboxyl radical so as to combine to form an imidazoline ring as previously described, or obviously to combine with an amine to form an amide group, or with a polyamine to form not only an amide group but also a compound which again can be reacted with an aminoglycidyl ether as above described to introduce a high molal group. Furthermore, such carboxyl group could be esterified with triethanolamine or the like, or with a comparable polyamine to produce an amino ester.

Attention is directed to the fact that a compound such as N-octadecyl N,N',N' tris-2-hydroxyethyl-1,3-trimethylene diamine having the following formula $$C_{18}H_{37}-\overset{CH_2CH_2OH}{\underset{}{N}}-CH_2CH_2CH_2N\overset{CH_2CH_2OH}{\underset{CH_2CH_2OH}{}}$$

can be esterified with acetic acid or oleic acid to introduce an amino ester radical. Similarly, the amino ester so derived can be reacted in turn with an alkylene imine such as ethylene imine or propylene imine and then reacted with another mole of acid so as to introduce a third type, to wit, an amido type radical.

*Section 7*

An interesting group of compounds which have been noted previously are the non-cyclic amidines having the general formula $$\overset{R_1}{\underset{R_2}{\diagdown}}N \cdot (CH_2)_n C\overset{NH}{\underset{NH_2}{\diagdown\!\!\!\!\!=}}$$

where $R_1$ and $R_2$ are either or both an alkyl group or hydrogen, and $n$, an integer from 7 to 13. See British Patent 518,575.

Specific examples described in said British patent include the following:

$$(C_2H_5)_2 \cdot N \cdot (CH_2)_{10} \cdot C\overset{NH}{\underset{NH_2}{\diagdown\!\!\!\!\!=}}$$

Kappa-diethylamino-n-undecane amidine $$(C_4H_9)_2 \cdot N \cdot (CH_2)_{10} \cdot C\overset{NH}{\underset{NH_2}{\diagdown\!\!\!\!\!=}}$$

Kappa-dibutylamino-n-undecane amidine $$(C_4H_9)_2 \cdot N \cdot (CH_2)_{11} \cdot C\overset{NH}{\underset{NH_2}{\diagdown\!\!\!\!\!=}}$$

Lambda-dibutylamino-n-dodecane amidine

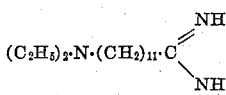

Lambda-diethylamino-n-dodecane amidine

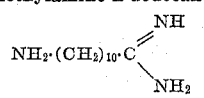

Kappa-amino-n-undecane amidine

Other suitable polyamino compounds which form salts or salt complexes as herein described, may contain acyl radicals or an acyl radical residue from low molal monocarboxy acids as, for example, acetic acid, propionic acid, butyric acid, hydroxyacetic acid, lactic acid, etc. This applies not only to cyclic amidines but also other compounds such as high molal polyamines, esters of hydroxylated polyamines, etc. Purely by way of example attention is directed to the following formulas which illustrate such compounds:

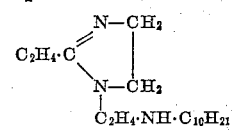

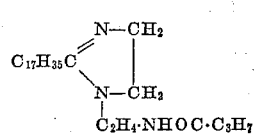

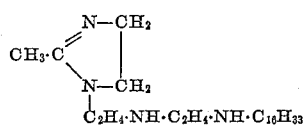

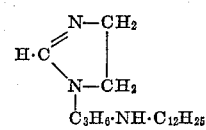

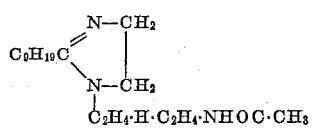

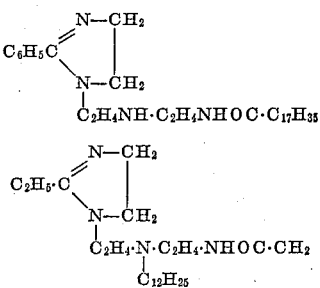

Needless to say, the same comparable compounds can be obtained from another type of cyclic amidine, to wit, a tetrahydropyrimidine.

Other examples suitable for the present purpose are obtained by reacting high molal diamines of the formula

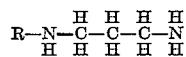

where R varies from 8 to 18 and particularly from 12 to 18, with a single mole of low molal monocarboxy acid such as acetic acid, propionic acid, butyric acid, etc.

Section 8

In many instances monoamines can be reacted with ethylene imine, propylene imine, or a dialkyl amino-epoxypropane such as

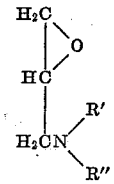

wherein R' and R" are alkyl groups, to convert a monoamino compound into a polyamino compound. This can be illustrated by suitable polyamino compounds having an oxazoline ring (5-membered or 6-membered).

TABLE 5

General reaction:

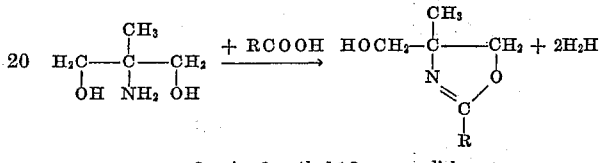

2 amino-2-methyl-1,3-propanediol
R = alkyl

Stearic acid, $CH_3(CH_2)_{16}COOH$:

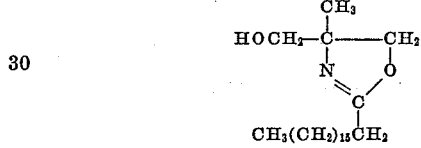
(A)

Oleic acid, $C_8H_{17}CH:CH(CH_2)_7COOH$:

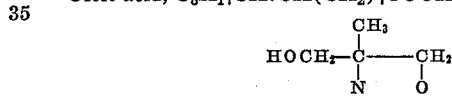
(B)

Lauric acid, $CH_3(CH_2)_{10}COOH$:

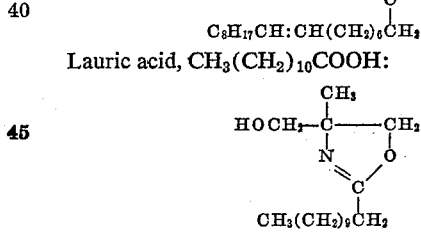
(C)

Let $R_1OH$ be the simplified structure for all the four hydroxyethyl oxazolines.

General reaction:

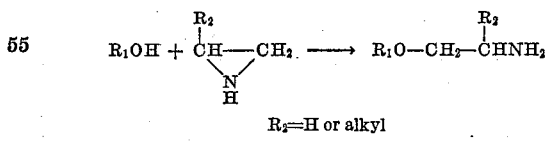

$R_2$ = H or alkyl (1) (A) + ethylene imine:

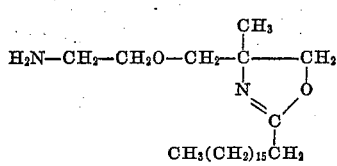

(2) (B) + ethylene imine:

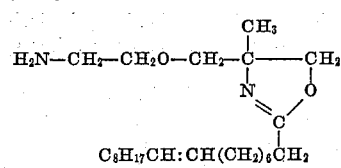

(3) (C)+ethylene imine:

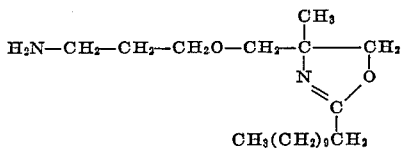

(4) (A)+propylene imine:

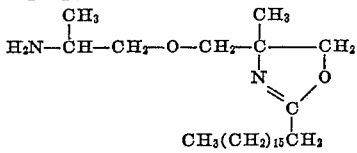

(5) (B)+propylene imine:

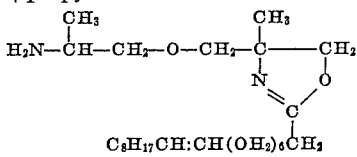

General reaction:

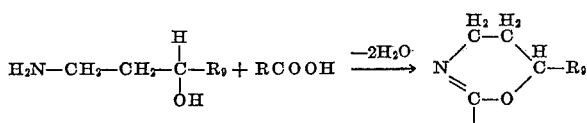

(6) (G)+RCOOH where R=C₁₁H₂₃,

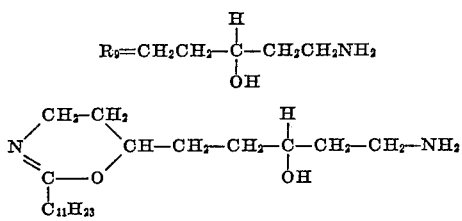

Section 9

In U.S. Patent 2,819,284, of Kwan-Ting Shen, there is described an apparently new class of materials, to wit, disubstituted cyclic amidines of the class of tetrahydropyrimidines and amino-imidazolines of the structure

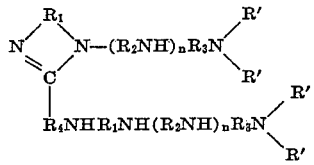

$R_1$, $R_2$, and $R_3$ are divalent hydrocarbon radicals containing at least 2 and not more than 3 carbon atoms in the straight chain; $R_4$ is the radical of an alpha-beta unsaturated acid having not over 18 carbon atoms and obtained by the elimination of the 2 carboxyl oxygen atoms; R is selected from the class of hydrogen atom and hydroxyl alkyl radicals having not over 4 carbon atoms, and n is an integer including zero; and

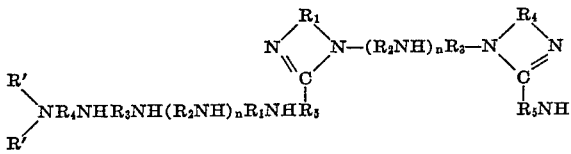

in which $R_4$ is a divalent radical, $R_5$ is derived from an alpha-beta unsaturated acid, and the other symbols have their prior significance.

These materials are obtained by reaction between polyamines such as the polyethylene amines previously described, i.e., triethylene tetramine, tetraethylene pentamine, etc., and certain alpha-beta unsaturated acids such as acrylic acid, crotonic acid, methacrylic acid, agelic acid, and sorbic acid.

It will be noted one can also prepare such products from nondistillable polyethylene amines, for instance, the residual mixture in polyethylene manufacture which consists largely of pentaethylene hexamine or hexaethylene heptamine. Using such high amino compounds having, for instance, 6 or 7 nitrogen atoms per molecule one can obtain reactants which have as many as 20 nitrogen atoms in the molecule. Similarly, one can react dicarboxy or tricarboxy acids with 2 or 3 moles of the same polyamines having 5, 6 or 7 nitrogen atoms and obtain amides, polyamides or combinations in which cyclic amidine groups also appear and which may likewise have as many as 10 to 20 nitrogen atoms per molecule. In a general way, compounds of the types just referred to having up to 20 nitrogen atoms per molecule represent a practical upper limit in many cases.

Section 10

Said aforementioned Shen patent 2,819,284 also describes another class of material which can be used as reactants in the present invention, to wit, a somewhat analogous class of disubstituted cyclic amidines has been illustrated in which one substituent does not necessarily have a nitrogen atom. This is an instance of the kind in which hydroxyethyl ethylene diamine, hydroxypropyl ethylene diamine, hydroxybutyl ethylene diamine, hydroxy ethyl 1,3-propylene diamine, hydroxypropyl 1,3-propylene diamine, hydroxybutyl 1,3-propylene diamine, or the like, are used to give a type of compound previously illustrated to wit,

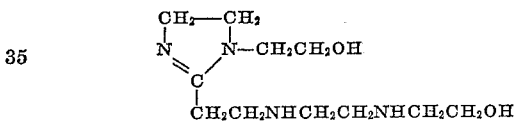

Furthermore, the precursory diamines of the kind referred to above can be reacted with other alkylene oxides such as glycide, methyl glycide, allyl glycidyl ether, glycidyl isopropyl ether, glycidyl phenyl ether, styrene oxide, etc., on a mole-for-mole basis. The resultant of such reaction can be used in the same manner as the substituted diamines above noted.

The type of compounds described in aforementioned Shen application, Serial No. 521,387, filed July 11, 1955, are particularly valuable as reactants for the reason that either the class of materials described in Section 8, preceding, or in the present section, can be prepared free from any high molal group or a group which has at least 8 uninterrupted carbon atoms. Therefore, particularly valuable products are obtained by combination with the epoxidized products herein described which in turn supply a high molal group.

Attention is again directed to the fact that the polynitrogenous reactants preferably contain at least one basic nitrogen and preferably two or more. Furthermore, it is preferable that there be present at least one, and preferably two, primary amino groups. If one reacts ethylene diamine, diethylene triamine, triethylene tetramine, tetraethylene pentamine, or the like with 2 moles of a low molal acid such as acetic acid, propionic acid, butyric acid, or with a higher fatty acid such as oleic acid or stearic acid, or a combination of the two, one can obtain a compound having 2 amido radicals in which there is no basic nitrogen atom. If one uses one mole of an acid there is a single basic nitrogen atom. Our preference, however, is to use compounds in which

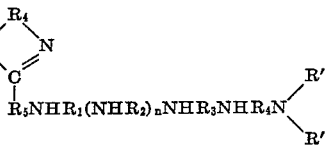

there are at least 2 basic nitrogen atoms and preferably having at least 2 basic primary amino groups. For this reason the preference in many instances is to employ polyamines such as diethylene triamine, triethylene tetramine, tetraethylene pentamine, etc. In a large number of the examples which have appeared in the sections preceding, the compounds illustrated have high molal radicals, for instance, one having 8 to 18 carbon atoms. It is again desirable to point out that this is no limitation to the broad aspect of the invention. In each instance such high molal radicals can be replaced by a methyl group, ethyl group, propyl group, butyl group, amyl group, hexyl group, heptyl group, or the like.

Phenylenediamine represents an example of a polyamine which contributes substantially no basicity to the product of reaction.

Section 11

Another type of compound which may be reacted with the epoxidized derivatives are the hydrazines and hydrazine derivatives of the kind which have been described in numerous patents. Although hydrazine, particularly the hydrate, can be reacted with epoxy compounds provided, of course, that extreme caution is taken to avoid any hazard, we have found it of equal interest to use beta hydroxyethyl hydrazine which is commercially available.

Other compounds which may be employed are those which correspond to the formula

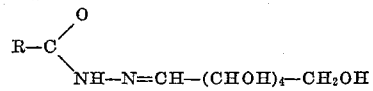

The acyl radical RCO can be derived from a low molal acid or a high molal acid such as stearic acid.

See also U.S. Patent No. 2,371,133 which describes hydrazine derivatives containing hydroxyalkyl radicals which are obtained by condensing one mol of a hydrazide of an aliphatic carboxylic acid containing at least 2 carbon atoms, which hydrazide contains at least one hydrogen atom bound to a hydrazine nitrogen atom, with at least one mol of an alkylating agent which is capable of introducing an aliphatic radical containing the grouping —C—C— and also hydroxyl groups.

As to the manufacture of 2-hydroxyethyl hydrazine see U.S. Patent No. 2,660,607 dated November 24, 1953, to Gever et al.

Note also that low polymers of hydrazine or similar compounds, such as polymethylene dihydrazines of the formula $H_2N \cdot NH \cdot (CH_2)_n \cdot NH \cdot NH_2$ may be employed as a reactant with the epoxidized derivatives. For further description of such polymethylene dihydrazines see U.S. Patent No. 2,445,518, dated July 20, 1948, to Dreyfus.

PART 3

Part 3 is concerned with reactions between the two classes of reactants described in the foregoing, i.e., those described in Parts 1 and 2.

For purpose of brevity we are going to limit the examples to products which are available commercially or can be obtained from suppliers of epoxidized products. These products are the following:

(1) Epoxidized soybean oil
(2) Epoxy butyl stearate
(3) Isobutylepoxyacetoxy stearate
(4) Methylepoxy soyate
(5) Epoxidized triacetylated castor oil
(6) Epoxidized alcohol derived from soybean fatty acid.

As previously pointed out the reaction involving the reactant containing the oxirane ring and the selected compound having a labile hydrogen atom is essentially a variety of oxyalkylation. For this reason the reactions are so conducted. The procedure is simpler than is the case when ethylene oxide or propylene oxide is used for the reason that the reactants are non-volatile as a rule and thus one does not have to use an autoclave or similar equipment. Furthermore, many of the reactants employed are basic in character and thus to the extent required act as their own catalyst. As has been pointed out elsewhere catalysts can be added, particularly alkaline catalysts such as sodium methylate, caustic soda, caustic potash, etc. In a general way, the procedure employed in preparing the reactants is the same and the only precaution taken as a rule is to avoid temperatures above that required to rupture the oxirane ring for the reason that side reactions or secondary reactions may take place. The procedure is illustrated by Examples 1a and 13a and then by Tables Six through Twelve, which present the data covering the preparation of a wide variety of products from the reactants described previously.

Example 1a

A 300 ml. three-necked flask was fitted with a reflux condenser, a thermometer, and an efficient sealed stirrer. In the flask was placed 150 grams of Admex 711 [1] (epoxidized soybean oil) and 43 grams of diethylene triamine. The mixture was first stirred for 10 minutes to insure thorough mixing; then heat was gradually applied to bring its temperature to 105° C. within half an hour. The reaction was allowed to continue at 105° C. for 3 hours. Then the temperature was raised to 130° C. to complete the reaction. The product was an amber colored viscous liquid, soluble in xylene and isopropyl alcohol and emulsifiable with water.

[1] Admex is the trademark of Archer, Daniels, Midland Company, to indicate their particular products.

Example 13a

In the same equipment as used in Example 1a, 175 grams of the epoxybutyl stearate were used along with 49 grams of diethylene triamine. No added catalyst was employed. The reaction took place readily at 110° C., the time required was 3 hours. The final product was a brown liquid, soluble in both xylene and isopropanol and having definite surface active properties.

Additional examples appear in the following tables.

TABLE 6

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 1a | Epoxidized soybean oil | 150 | Diethylene triamine | 57 | -------- | 105 / 130 | 3 / 0.5 | Amber viscous liq. sol. in xylene and isopropanol. |
| 2a | | 125 | Amine 333 | 67.6 | -------- | 105 / 130 | 3 / 0.5 | Orange viscous liq. sol. in xylene and isopropanol. |
| 3a | | 150 | Hydroxyethyl ethylene diamine | 55.4 | -------- | 105 / 130 | 3 / 0.5 | Yel. visc. liq. sol. in xylene and isopropanol. |
| 4a | | 125 | Cyclohexylamine | 46 | -------- | 120 / 165 | 2 / 2 | Brn. visc. liq. sol. in xyl. and panol. |
| 5a | | 125 | Morpholine | 40.3 | -------- | 120 | 3 | Yel. visc. liq. sol. in xyl. and isopropanol. |
| 6a | | 125 | Furfurylamine | 45 | -------- | 130 | 3 | Dk. brn. liq. sol. in xylene and isopropanol. |

TABLE 7

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 7a | Epoxybutyl Stearate | 60 | Dimeric acid diimidazoline | 178 | -------- | 125 | 3 | Black semi-solid sol. in xylene. |
| 8a | ------ | 184 | Armeen 18 | 157 | -------- | 110 / 150 | 2 / 0.5 | Brn. visc. liq. sol. in alc. and xylene. |
| 9a | ------ | 184 | Aminoethyl stearamide | 155 | -------- | 110 / 150 | 3 / 0.5 | Dk. brn. visc. liq. sol. in alcohol and xylene. |
| 10a | ------ | 184 | Bisimidazoline from diglycolic acid. | 68 | 1.7 | 120 / 160 | 2 / 2 | Blk. vis. liq. sol. in alc. and xylene. |
| 11a | ------ | 150 | Hydrazine | 13.7 | -------- | 110 | 3 | White creamy emul. with 5% H₂O in hydrazine sol. in hot xyl. and isopropanol. Crystalline in cold xyl. and isopropanol. |
| 12a | ------ | 175 | Ethylene diamine | 35 | -------- | 110 | 3 | Brn. liq. sol. in xyl. and isoprop. |
| 13a | ------ | 175 | Diethylene triamine | 49 | -------- | 110 | 3 | Do. |
| 14a | Epoxybutyl stearate | 150 | Triethylene tetramine | 59.5 | -------- | 110 | 3 | Do. |
| 15a | ------ | 175 | Tetraethylene pentamine | 90 | -------- | 110 | 3 | Brn. liq. sol. in xyl. isopropanol and water. |
| 16a | ------ | 150 | Propylene diamine | 30.2 | -------- | 110 | 3 | Do. |
| 17a | ------ | 150 | Propylene triamine | 36.2 | -------- | 110 | 3 | Brn. liq. sol. in xyl. and isopropanol. |
| 18a | Epoxybutyl stearate | 150 | Duomeen S | 164.0 | -------- | 130 | 3 | Lt. brn. semi-sol. solu. in xyl. and isopropanol. |
| 19a | ------ | 150 | Hydroxyethyl ethylene diamine | 428 | -------- | 115 | 3 | Lt. brn. liq., sol. in xyl. and isopropanol. |
| 20a | ------ | 150 | Aminobutanol | 36.3 | -------- | 125 | 3 | Dk. brn. liq. sol. in xyl. and isopropanol. |
| 21a | ------ | 150 | Aminoethyl propanediol | 48.5 | -------- | 125 | 3 | Red vis. liq. sol. in xyl. and isopropanol. |

TABLE 8

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 22a | isobutylepoxy acetoxy stearate. | 241 | Diethanol amine | 42.8 | 1.4 | 130 | 3 | Lt. brn. liq. sol. in xyl. and alcohol. |
| 23a | ------ | 241 | Trishydroxymethylaminoethane | 57.5 | 1.5 | 115 / 170 | 3 / 2 | Brn. liq. sol. in xylene and alcohol. |
| 24a | ------ | 241 | 1,6 hexane diamine | 60.5 | -------- | 115 | 3 | Do. |
| 25a | ------ | 241 | Cyclohexylamine | 40.5 | -------- | 130 | 3 | Dk. brn. liq. sol. in xyl. and alcohol. |
| 26a | ------ | 241 | Diphenylamine | 69.0 | -------- | 120 / 170 | 2 / 2 | Do. |
| 27a | ------ | 241 | m-phenylene diamine | 44.0 | -------- | 120 / 160 | 2 / 2 | Black visc. liq. sol. in xylene and alcohol. |

TABLE 9

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 28a | Methyl [1] Epoxysoyate | 150 | Ethylene diamine (78%) | 38 | -------- | 120 / 150 | 2 / 0.5 | Brn. vis. liq. sol. in xyl. and isopropanol. |
| 29a | ---do--- | 150 | Propylene diamine | 37 | -------- | 120 / 150 | 1.5 / 0.5 | Dk. brn. vis. liq. sol. in xyl. and alcohol. |
| 30a | ---do--- | 150 | m-Phenylene diamine | 54 | -------- | 120 / 165 | 2 / 2 | Dk. brn. very vis. liq. sol. in xyl. and alcohol. |
| 31a | ---do--- | 160 | Hydrazine (95%) | 17 | -------- | 110 | 3 | White creamy liq. sol. in hot xyl. and isopropanol. |
| 32a | ---do--- | 150 | Diethanolamine | 53 | 1 | 130 | 3 | Brn. vis. liq. sol. in xyl. and alcohol. |
| 33a | ---do--- | 100 | Rosin amine D | 105 | -------- | 120 / 165 | 3 / 0.5 | Lt. yel. liq. sol. in xyl. and alcohol. |
| 34a | ---do--- | 150 | Morpholine | 45 | -------- | 120 | 3 | Yel. vis. liq. sol. in xyl. and alc. |
| 35a | ---do--- | 150 | Hydroxyethyl ethylene diamine | 53 | -------- | 105 / 130 | 3 / 0.5 | Yel. vis. liq. xyl. and isoprop. soluble. |
| 36a | ---do--- | 150 | Furfuryl amine | 49 | -------- | 130 | 3 | Dk. brn. vis. liq. xyl. and isoprop. soluble. |

[1] Methyl epoxysoyate—Epoxidized methyl ester of soyabean fatty acid.

TABLE 10

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 37a | Epoxidized triacetylated castor oil. | 162 | Propylene triamine | 27.6 | -------- | 110 | 3 | Dk. brn. semi-sol. solu. in xyl. and isopropanol. |
| 38a | ----do---- | 162 | Aminobutanol | 27 | -------- | 125 | 3 | Brn. vis. liq. sol. in xylene and alcohol. |
| 39a | ----do---- | 162 | Aminoethyl propanediol | 35.7 | -------- | 125 | 3 | Dk. red vis. liq. sol. in xyl. and alco. |
| 40a | ----do---- | 162 | m-phenylene diamine | 32.4 | -------- | 120 / 160 | 2 / 2 | Blk. vis. semi-sol. solu. in xyl. and alcohol. |
| 41a | ----do---- | 135 | Aminoethyl stearamide | 78 | -------- | 110 | 3 | Brn. vis. liq. sol. in xyl. and isopropanol. |
| 42a | ----do---- | 189 | Hydrazine | 12 | -------- | 110 | 3 | White creamy semi-solid sol. in hot xyl. and hot isopropanol. |
| 43a | ----do---- | 135 | Stearylamine | 89 | -------- | 110 / 150 | 2 / 0.5 | Brn. vis. liq. sol. in xyl. and alcohol. |
| 44a | ----do---- | 135 | Duomeen S | 100 | -------- | 130 | 3 | Lt. brn. semi-sol. solu. in xyl. and isopropanol. |
| 45a | ----do---- | 135 | Rosin amine D | 79 | -------- | 120 / 150 | 2 / 1 | Lt. brn. visc. liq. sol. in xyl. and alcohol. |
| 46a | ----do---- | 108 | Dimeric acid dimidazoline | 158 | -------- | 130 | 3 | Black semi-solid sol. in xylene. |
| 47a | ----do---- | 135 | Amino-ethyl oleyl imidazoline | 98.5 | -------- | 130 | 3 | Dk. brn. semi-sol. solu. in xyl. and alcohol. |
| 48a | ----do---- | 162 | N - phenyl - 2 - methyl - 1,2 - propane diamine. | 49 | -------- | 130 | 3 | Brn. vis. liq. sol. in xyl. and alcohol. |

TABLE 11

| Ex. No. | Oxirane ring containing reactant | Amt., gms. | Oxyalkylation susceptible reactant | Amt., gms. | Catalyst, sodium methylate, gms. | Temp., °C. | Time, hrs. | Product of reaction |
|---|---|---|---|---|---|---|---|---|
| 49a | Epoxidized alcohol from soybean oil (epoxidized Unadol 40). | 155 | Ethylene diamine | 40 | -------- | 120 / 150 | 1.5 / 0.25 | Visc. brn. liq. sol. in xyl. and alc. |
| 50a | ----do---- | 155 | Tetramethylene pentamine | 95 | -------- | 120 / 150 | 1.5 / 0.5 | Vis. liq. sol. in xyl. and alcohol. |
| 51a | ----do---- | 155 | Amine 333 | 73 | -------- | 120 / 150 | 1.5 / 0.5 | Lt. brn. vis. liq. sol. in xyl. and alcohol. |
| 52a | ----do---- | 155 | Hydroxyethyl ethylene diamine. | 52 | -------- | 120 / 150 | 1.5 / 0.25 | Lt. brn. liq. sol. in xylene and alcohol. |
| 53a | ----do---- | 155 | Diethanolamine | 53 | 1 | 130 | 3 | Brn. visc. liq. sol. in xyl. and alc. |
| 54a | ----do---- | 155 | Rosin amine D | 158 | -------- | 120 / 150 | 2 / 1 | Lt. brn. visc. liq. sol. in xyl. and alc. |

TABLE 12

| Additive No. | Oxirane containing reactant | Amt., gms. | Oxyalkylation susceptible reactant | Amt., gms. | Temp., °C. | Time, hrs. |
|---|---|---|---|---|---|---|
| 1b | Epoxidized soybean oil | 150 | Ethylene diamine | 45 | 105 / 300 | 2 / 0.5 |
| 2b | ----do---- | 100 | Triethylene tetramine | 57.3 | 125 | 3 |
| 3b | ----do---- | 125 | Amine 333 | 67.6 | 125 / 130 | 3 |
| 4b | ----do---- | 150 | Amine No. 1 | 67.5 | 215 | 2 |
| 5b | ----do---- | 150 | Amine 910 | 60 | 230 | 2.5 |
| 6b | ----do---- | 150 | Diethylene triamine | 60.5 | 125 | 3 |
| 7b | Epoxybutyl stearate | 150 | Polyamine 333 | 59.5 | 115 / 240 | 2 / 1 |
| 8b | ----do---- | 150 | Triethylene tetramine | 59 | 110 / 230 | 1.5 / 0.5 |
| 9b | Methyl epoxy stearate | 90 | Ethylene diamine | 36 | 120 / 300 | 3.5 / 0.5 |
| 10b | Epoxybutyl stearate | 200 | 1,6-hexylene diamine 72% | 40.5 | 110 / 155 | 2 / 2 |
| 11b | Epoxidized triacetylated castor oil | 175 | Triethylene tetramine | 79 | 240 | 1.5 |
| 12b | Epoxybutyl stearate | 150 | Diamino propane | 27 | 120 | 3 |
| 13b | Epoxidized soybean oil | 150 | Cyclohexylamine | 40.5 | 135 | 3 |
| 14b | Epoxidized triacetylated castor oil | 160 | Ethylene diamine 78% | 43 | 120 | 3 |
| 15b | Epoxybutyl stearate | 150 | Cyclohexylamine | 33 | 115 | 3 |
| 16b | Epoxidized soybean oil | 125 | Diamino propane | 30.2 | 110 | 2 |
|  |  |  | Cyclohexylamine | 46 | 120 / 165 | 2 / 2 |
| 17b | Epoxidized triacetylated castor oil | 160 | Hydroxyethyl ethylene diamine | 35 | 110 / 120 | 3 |
| 18b | ----do---- | 175 | Hydrazine | 12.3 | 100 | 3 |

In Tables 6 to 12, reference has been made to products by their trade name or equivalent, all of which are described in detail in the text immediately following:

Amine 333 is a product of Mathieson Chemical Corporation. It is composed of diethylene triamine, triethylene tetramine and tetraethylene pentamine in equal weight proportions.

Oxyethylated Rosin Amine D is a technical grade of dehydroabietylamine produced by Hercules Powder Company.

Dimeric Acid Diimidazoline is the reaction product of two moles of triethylene tetramine and one mole of Emery Dimeric Acid. Emery Dimeric Acid is dimerized linoleic acid produced by the Emery Industries, Incorporated.

Armeen 18 is a technical grade of stearylamine produced by Armour Chemical Company.

Duomeen S is an amino propyl alkylamine,

derived from soya fatty acid. It is a product of Armour Chemical Company.

Ethomeen S/15 is also a product of Armour Chemical Company. It is the reaction product of five moles of ethylene oxide and one mole of primary alkyl amine derived from soya fatty acid.

Unadol 40 is a product of Archer-Daniels-Midland Company. It is an unsaturated $C_{18}$ alcohol derived from soyabean oil.

Amine 910 and Amine No. 1 are crude fractions of polyethylene amines. Amine 910 contains 90% of diethylene triamine 10% of triethylene tetramine while amine No. 1 contains 65% diethylene triamine, 25% triethylene tetramine and 10% tetraethylene pentamine.

As previously pointed out, a large proportion of the products described above have one or more basic nitrogen atoms. Thus it is possible to add a high molal acid or low molal acid so as to form a salt with the residual basicity. In a number of instances salt formation changes or alters the solubility of the free base in either oil or water and for a number of purposes makes the salt form more attractive. Where the base has a plurality of basic nitrogen atoms one can neutralize one or more as desired. In general, salt formation with a low molal acid tends to increase water solubility and salt formation with a high molal acid tends to increase oil solubility. Thus, the basic products of reaction can be reacted with low molal acids such as acetic acid, lactic acid, glycolic acid, propionic acid, diglycolic acid and the like to increase water solubility. If desired, however, one can use naphthenic acid, higher fatty acids, tall oil sulfonic acids, and oil soluble petroleum sulfonic acids such as mahogany acids to form salts.

Table 13 immediately following shows combinations of products which appeared in prior tables combined with various acids illustrating what has been said in this part of the text.

TABLE 13

| Compound No. | Amount, grams | Acid used | Amount, grams | Isopropanol, gms | Water, grams | Solution concentration, percent |
|---|---|---|---|---|---|---|
| 1a | 50 | Acetic acid | 7.8 | 30 | 27.8 | 50 |
| 4a | 50 | ___do___ | 8.3 | 30 | 28.3 | 50 |
| 6a | 50 | Glycolic acid | 15.0 | 30 | 30.5 | 50 |
| 7a | 50 | ___do___ | 3.8 | 52.6 | ___ | 50 |
| 8a | 50 | Lactic acid | 6.7 | 56.7 | ___ | 50 |
| 9a | 50 | ___do___ | 6.7 | 56.7 | ___ | 50 |
| 12a | 50 | Propionic acid | 8.4 | 30 | 28.4 | 50 |
| 15a | 50 | ___do___ | 13.2 | 30 | 33.2 | 50 |
| 18a | 50 | Diglycolic acid | 5.5 | 55.5 | ___ | 50 |
| 24a | 50 | ___do___ | 3.2 | 30 | 23.2 | 50 |
| 26a | 50 | Adipic acid | 2.5 | 30 | 23.5 | 50 |
| 49a | 50 | ___do___ | 9.4 | 30 | 27 | 50 |
| 51a | 50 | Succinic acid | 9.7 | 30 | 29.7 | 50 |
| 53a | 50 | ___do___ | 3.5 | 30 | 53.5 | 50 |

Furthermore, the products described in Part 3 have at least one reactive hydrogen atom on the hydroxyl group formed by rupture of the oxirane ring and hence are susceptible to reaction with an alkylene oxide. Thus to increase their water solubility they can be treated with one or several moles of, for example, ethylene oxide, glycide, methyl glycide, etc.

Sometimes in an effort to maintain a maximum yield of the compound formed by reaction of the materials described in Parts 1 and 2, there may be formed other products as a result of the change which takes place at least in part after the principal product of reaction has been formed. Without attempting to indicate the variety of complex reactions which can take place and also from the standpoint of indicating why in the hereto attached claims the products are described by method of manufacture, it may be well to illustrate the matter by reference to the cheapest commercially available epoxidized product, to wit, an epoxidized glyceride such as epoxidized soyabean oil, indicated by the formula

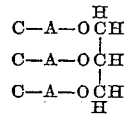

wherein A represents an oxirane ring.

Such epoxidized glyceride can be reacted with at least 2 moles of a polyamine. Theoretically and actually at least one mole of the polyamine can be caused to react with at least the same number of oxirane rings as appear in the glyceride, i.e., from 2 to 6 moles of the polyamine.

Bearing in mind that the ester can also react to form at least a simple amide, in the same way that soyabean oil, for example, could be reacted with 3 moles of a polyethylene amine to give an amino amide, it is obvious the total number of moles of amine that could be reacted with the glyceride is not only the total number of oxirane rings present in the glyceride but also an additional mole for each acyl radical, i.e., 3 moles more.

It is also obvious that one polyamine may unite 2 or more glycerides by supplying a divalent radical. This may be indicated thus:

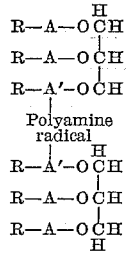

In the above formula A has been changed to A' to indicate that the ring has been opened and the polyamine radical is, of course, the divalent radical obtained from amines of the kind herein described. Needless to say, such cross-linking could involve not only 2 moles of glyceride but 3 or 4 moles.

Since the glyceride, like any other fatty acid equivalent, could act as an acylating agent it is obvious that amides could be formed and perhaps the simplest illustration is concerned with the non-saturated acid or, at least an acid which contains no oxirane ring as above depicted and may be indicated thus:

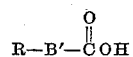

The amide formation from a polyethylene amine would be indicated thus:

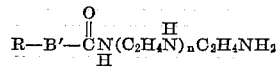

in which $n$ is a small whole number such as 1, 2, 3 or 4.

Re-examining the previous formula in which two glycerides were united by means of a polyamine radical, it is obvious that such radical could, of course, unite with an acyl radical by virtue of the terminal polyamino radical, forming an amide as previously depicted. This may be indicated thus:

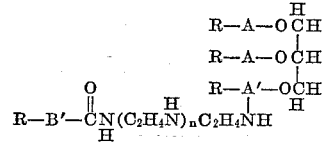

It is well known, of course, that the amides of polyamines which are characterized by a primary amino radical and a secondary amino radical separated by 2 or 3 carbon atoms on heating yield cyclic amidines, and in the case of polyethylene amines yield imidazolines. Various derivatives, of course, also are obtainable, such as amido imidazolines, etc. Without going further into the complexity of the invention as herein stated it is obvious it includes a variety of materials resulting from an initial reaction of an oxirane ring as specified and may result in amidification with the formation of cyclic amidines at a point above the initial reaction temperature and a point below pyrolysis. The formation of amides of cyclic amidines may be varied by the addition of more monocarboxy acids; in fact, different carboxy acids may be added, or if desired one can add dicarboxy acids. For this reason the present invention is limited merely to the reaction involving the rupture of the oxirane ring, subject to certain qualifications.

Actually, the complexities of epoxidized products go further in that when polyethylenic glycerides are subjected to epoxidation the oxirane ring may be formed and may be opened so as to form a hydroxyl group, or a dihydroxyl group with one ring being left intact. For instance, if one refers to the formulas that have been shown previously it becomes obvious that the radical indicated as R—A—A may become

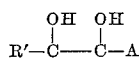

Then again if one starts with an unsaturated hydroxylated acid or glyceride, such as castor oil, it is possible to introduce a group like an acetyl group or an oleyl group and have a radical comparable to the following:

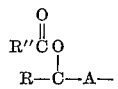

Referring to the two previous formulas, to wit,

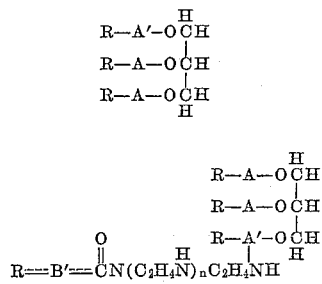

It is obvious that heating such glyceride can form an inner amide by reaction with the acyl radical to which the amino group is attached and such inner amide or intra-molecular amide can, of course, on being heated be converted into an inner cyclic amidine or an intramolecular cyclic amidine.

Bearing in mind what has been said previously in regard to the formation of 2 hydroxyl groups in a polyethylenic acyl radical and also in regard to the possible use of acylated triricinolein or the like, or the use of triricinolein having a single hydroxyl group, it becomes obvious that epoxidation by its very nature may make some slight change or some modest change in the acyl radical with the introduction of the oxirane ring but the product so obtained obviously is still within the claims hereto attached.

Stated another way, although the effort as far as this example goes is simply to react an epoxidized (glyceride) of the kind described with a polyamine of the kind described so as to open the oxirane ring and not necessarily go any further, yet it follows that as one tries to get a high yield in such reaction invariably and inevitably some other reaction, i.e., some sort of side reaction, may take place. Thus, although the products are described as reaction products involving a reactive hydrogen and the epoxidized glyceride, yet these side reactions may introduce and yield an appreciable amount in some instances of some of the products herein mentioned.

The acyl radical carrying the oxirane ring also may contain a single hydroxyl or two hydroxyls as the result of the opening of an oxirane ring by reaction with water. Furthermore, when the polyamine reacts with the oxirane ring there is a hydroxyl formed on the adjacent carbon atom. Thus, various reactions may take place involving one or more of these hydroxyl groups as, for instance, dehydration with the formation of an unsaturated bond, esterification or perhaps even in some instances the reforming of an oxirane ring from 2 adjacent hydroxyl groups with ultimate reaction. All of which emphasizes the complexity of the reactions involved, or rather the complexity of possible side reactions when one is attempting to produce mainly and substantially the initial resultant of the polyamine herein described and the epoxidized reactant.

Referring to the mixed epoxidized derivative, for instance, epoxidized butyl soyate or, for that matter, epoxidized soybean fatty acid, it is obvious one can react it with a polyamine, such as triethylene tetramine or tetraethylene pentamine, and form the product of the kind previously described. One can add another mole of such polyamine and neutralize the carboxyl radical or eliminate the alkyl radical and heat such product so as to form a cyclic amidine by reaction involving the carboxyl radical or its equivalent.

PART 4

The products prepared as described in Part 3 were evaluated generally according to the procedure outlined in "Bactericide Evaluation Method," by Dr. B. H. Moore, presented to Mid-Continent District, American Petroleum Institute Subcommittee on Biological Analysis of Injection Waters, St. Louis Meeting, May 23, 1957.

In this procedure, exposure fluids are prepared having the following compositions:

| | Low Hardness | Medium Hardness |
|---|---|---|
| Sodium sulfate (anhyd.), gm | 0.2 | |
| Magnesium sulfate (6 H₂O), gm | | 0.2 |
| Calcium chloride (2 H₂O) | | 7.5 |
| Sodium chloride | 10.0 | 4.0 |
| Tris (hydroxymethyl) aminomethane | 1.0 | 1.0 |
| Yeast extract, gm | 1.0 | 1.0 |
| Sodium lactate U.S.P. (60% syrup), ml | 4.0 | 4.0 |
| Distilled water, ml | 400 | 400 |

The pH of each fluid is then adjusted to 11.0, the fluid is allowed to stand overnight, or longer, and is then filtered with suction and diatomaceous earth. One gram of sodium formaldehyde sulfoxylate is added and then sufficient distilled water to one liter total volume. The pH is then adjusted to 7.5 and the fluid is put in an autoclave and heated for 15 to 20 minutes at 10–12 p.s.i. While hot, 0.2 gram of ferrous ammonium sulfate is added. The fluid is then cooled in running tap water.

The bactericides in proper dilution are placed in graded dosage in one-ounce screw-capped bottles so that the desired final concentrations will be present when the bottle is completely filled. The above exposure fluid is inoculated with a standardized culture of sulfate-reducing bacteria and used to fill the bottles to a slightly heaped state. Caps are screwed on and later tightened with pliers. Within an hour or two a viable count is prepared from the inoculated fluid.

The standardized culture of sulfate-reducing bacteria (*Desulfovibrio desulfuricans*) employed was an Illinois Strain A and had a count of about 100 to 200×10⁶ per milliliter. The objective was to test bactericides on the basis of a 99.9% kill in 24 hours contact. Therefore we diluted the daily culture of Strain A so that the exposure fluid contained a 1:10,000 dilution therefrom or to an estimated 10,000 to 20,000 viable cells per milliliter. Thereafter a 99.9% or 1000/1 kill was detected by survival of 10 to 2 cells per milliliter or less after exposure to the bactericide. This 10 to 20 colonies per culture tube was readily counted or estimated.

The following are results obtained from 99.9% kill of the sulfate-reducing bacteria within 24 hours in soft water and saline solutions containing calcium salts equivalent to 5000 p.p.m. hardness, as CaCO₃.

| Additive used | Effective concentration for 99.9% kill within 24 hours | |
|---|---|---|
| | Soft water | Hard water |
| | P.p.m. | P.p.m. |
| 1b | 5-7 | 20 |
| 2b | 7 | 20-30 |
| 3b | 6-7 | 20-50 |
| 4b | 1 | 1-5 |
| 5b | 4 | 10 |
| 6b | 10 | 50 |
| 3a | 50 | 200 |
| 15a | 6 | 10 |
| 7b | 4 | 20 |
| 8b | 5 | 50-100 |
| 11a | 4-6 | 50 |
| 12a | 7 | 20 |
| 7a | 15 | 500 |
| 9b | 8 | 20-50 |
| 10b | 5 | 20-50 |
| 51a | 5 | 30-50 |

Our product in a diluted form is used in the same manner that other bactericides are used in water flooding. A description of the procedure usually followed using such a product is given in an article, entitled "The Role of Microorganisms," by R. C. Allred, in Producers Monthly, volume 18, No. 4, pages 18–22.

The usual procedure for use of this product is to "slug" treat the water system with 50 parts per million of the diluted product and then reduce to the normal treating rate of 10–15 parts per million of a diluted product, continuously injected. Sampling and checking the water for sulfate reducers will show whether the chemical concentration need be raised or may be lowered to effectively curtail the bacterial growth to a low general bacterial count and effect a practically complete elimination of sulfate reducing bacteria from the water.

This is the common procedure used generally by operators of water treatment plants preparing injection water for water floods.

As to further information regarding the use of bactericides in treatment of flood water for secondary recovery, see the following references:

"Bacteria and Corrosion Control," Joseph N. Breston, The Oil and Gas Journal, August 25, 1949, pp. 96 et seq.

"Effect of pH on Water Intake Rates of Oil Sands," J. N. Breston and W. E. Johnson. The Producers Monthly, vol. 9, No. 12, October 1945, pp. 19–23.

"Field Test of Corrosion Inhibitor for Low-pH Flood Water," J. N. Breston and Kenneth Barton. The Oil and Gas Journal, December 6, 1947, pp. 91–92, 95–96.

"Further Field Test Results on Use of Corrosion Inhibitors and Bactericides for Secondary Flood Waters," E. T. Heck, J. K. Barton, and W. E. Howell, The Producers Monthly, May 1949.

"Prevention of Microbiological Growths in Water Flood Operations," Jay V. Beck. The Producers Monthly, vol. 11, No. 12, 1947, pp. 21–26.

The herein described bactericides also are effective as algaecides and slimicides. This means that if the flooding system involves an open pond or pool as is frequently the case this particular property has a distinctive advantage.

Specific attention is directed to the article by Torrey entitled "Preparation of Water for Injection Into Water Reservoirs," which appeared in the Journal of Petroleum Technology, volume 7, No. 4, page 9 (April 1955).

We claim:

1. In a flooding process for the recovery of oil from oil-bearing strata taking place in the presence of anaerobic sulfate-reducing bacteria and soluble ferrous salts, the improvement which comprises flooding the oil-bearing strata with an aqueous liquid containing an amount sufficient to inhibit growth of the anaerobic sulfate-reducing bacteria of the products obtained by reacting at a temperature of about 100° to 300° for from about 1 to 4 hours (A) an oxirane ring containing compound selected from the class consisting of epoxidized higher fatty acids, epoxidized lower alkanol esters of higher fatty acids, epoxidized ammonia and $C_1$ to $C_{12}$ alkyl primary monoamine amides of higher fatty acids, epoxidized higher fatty alcohols and epoxidized higher fatty acid glycerides, with (B) an oxyalkylation-susceptible nitrogen containing compound selected from the class consisting of hydrazine and monoamino and polyamino compounds composed of carbon, hydrogen, oxygen and nitrogen atoms, having only functional groups selected from the class consisting of hydroxyl groups, primary amino groups and secondary amino groups and having at least one such functional amino group; said reaction between (A) and (B) involving rupture of each oxirane ring and resulting in the formation of at least one of the following groupings

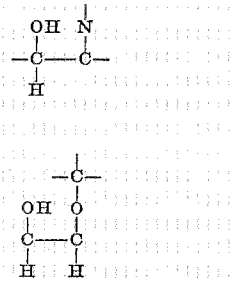

and

2. The process of claim 1 wherein the oxirane ring containing compound is epoxidized soyabean oil.

3. The process of claim 1 wherein the oxirane ring containing compound is epoxybutyl stearate.

4. The process of claim 1 wherein the oxirane ring containing compound is epoxymethyl stearate.

5. The process of claim 1 wherein the oxirane ring containing compound is an epoxidized alcohol derived from soyabean oil.

6. The process of claim 1 wherein the oxirane ring containing compound is epoxidized soyabean oil and the oxyalkylation-susceptible nitrogen containing compound is a mixture of diethylene triamine, triethylene tetramine and tetraethylene pentamine.

7. The process of claim 1 wherein the oxirane ring containing compound is epoxidized soyabean oil and the oxyalkylation-susceptible nitrogen containing compound is ethylene diamine.

8. The process of claim 1 wherein the oxirane ring containing compound is epoxybutyl stearate and the oxyalkylation-susceptible nitrogen containing compound is a mixture of diethylene triamine, triethylene tetramine and tetraethylene pentamine.

9. The process of claim 1 wherein the oxirane ring containing compound is epoxybutyl stearate and the oxyalkylation-susceptible nitrogen containing compound is hydrazine.

10. The process of claim 1 wherein the oxirane ring containing compound is an epoxidized alcohol derived from soyabean oil and the oxyalkylation-susceptible nitrogen containing compound is a mixture of diethylene triamine, triethylene tetramine and tetraethylene pentamine.

References Cited in the file of this patent

UNITED STATES PATENTS

| | | |
|---|---|---|
| 2,290,174 | Epstein et al. | July 21, 1942 |
| 2,445,892 | Swern et al. | July 27, 1948 |
| 2,567,237 | Scanlan et al. | Sept. 11, 1951 |
| 2,761,870 | Payne et al. | Sept. 4, 1956 |
| 2,819,278 | De Groote et al. | Jan. 7, 1958 |
| 2,839,467 | Hutchinson et al. | June 17, 1958 |
| 2,890,228 | Forester | June 9, 1959 |